United States Patent
Isailovski et al.

(10) Patent No.: US 8,509,971 B1
(45) Date of Patent: Aug. 13, 2013

(54) RAILWAY BRAKING AND THROTTLE GUIDANCE USER INTERFACE

(75) Inventors: Aleksander Isailovski, Warren, NJ (US); James Krietemeyer, Brooklyn, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 13/585,283

(22) Filed: Aug. 14, 2012

(51) Int. Cl.
G05D 1/00 (2006.01)
G05D 3/00 (2006.01)
G06F 7/00 (2006.01)
G06F 17/00 (2006.01)
B61L 3/00 (2006.01)
B60T 13/66 (2006.01)

(52) U.S. Cl.
CPC ........... *B61L 3/006* (2013.01); *B61L 3/008* (2013.01); *B60L 2200/26* (2013.01); *B60T 13/665* (2013.01); *Y02T 10/7258* (2013.01)
USPC ....... 701/20; 246/182 A; 246/182 B; 246/182 BH; 246/182 C; 246/182 AA; 340/905; 701/1; 701/2; 701/19; 701/93; 701/96

(58) Field of Classification Search
CPC ....... B61L 3/006; B61L 3/008; B60L 220/26; B60T 13/665; Y02T 10/7258
USPC ............... 701/1, 2, 19, 93, 96; 246/182 A, 246/182 B, 182 BH, 182 C, 182 AA, 182 AB, 246/181, 186, 189, 191, 196, 200 R, 225, 246/240, 222, 242 C, 253, 248, 262, 263, 246/294, 295, 1 R, 1 C, 2 R, 3, 4, 167 R, 246/182 R; 340/905
See application file for complete search history.

(56) References Cited

U.S. PATENT DOCUMENTS

| | | | | |
|---|---|---|---|---|
| 6,226,588 | B1 * | 5/2001 | Teramura et al. | 701/93 |
| 6,366,845 | B1 * | 4/2002 | Kannonji | 701/96 |
| 7,200,471 | B2 * | 4/2007 | Kane et al. | 701/19 |
| 7,398,140 | B2 * | 7/2008 | Kernwein et al. | 701/19 |
| 8,019,496 | B2 * | 9/2011 | Matusiak et al. | 701/19 |
| 8,370,007 | B2 * | 2/2013 | Brooks et al. | 701/20 |
| 2007/0219681 | A1 * | 9/2007 | Kumar et al. | 701/19 |
| 2008/0167767 | A1 * | 7/2008 | Brooks et al. | 701/20 |
| 2008/0208393 | A1 * | 8/2008 | Schricker | 701/1 |
| 2010/0332058 | A1 * | 12/2010 | Kane et al. | 701/20 |
| 2011/0118914 | A1 * | 5/2011 | Brooks et al. | 701/20 |
| 2012/0310453 | A1 * | 12/2012 | Brooks et al. | 701/20 |
| 2013/0006443 | A1 * | 1/2013 | Woo et al. | 701/2 |

OTHER PUBLICATIONS

I-ETMS Human Machine Interface Standard; Released for Comment May 31, 2011; (37 pages).

* cited by examiner

*Primary Examiner* — John Q Nguyen
*Assistant Examiner* — James E Stroud

(57) ABSTRACT

A user interface includes a visual display with suggested speed control throttle and/or brake settings display portion, a speedometer display portion and a distance to target guide portion. The display provides intuitive feedback information helpful for train operator decisions on how and when to change train speed control throttle and/or brake settings. In some embodiments of the present invention the interface suggests brake and/or throttle settings for reducing train speed. The distance to target guide portion includes an analog target display that grows in size as the train approaches a target point speed change or stop position. The speedometer includes analog speed scale, speed indicator needle and a suggested target speed indicator display portions.

22 Claims, 8 Drawing Sheets

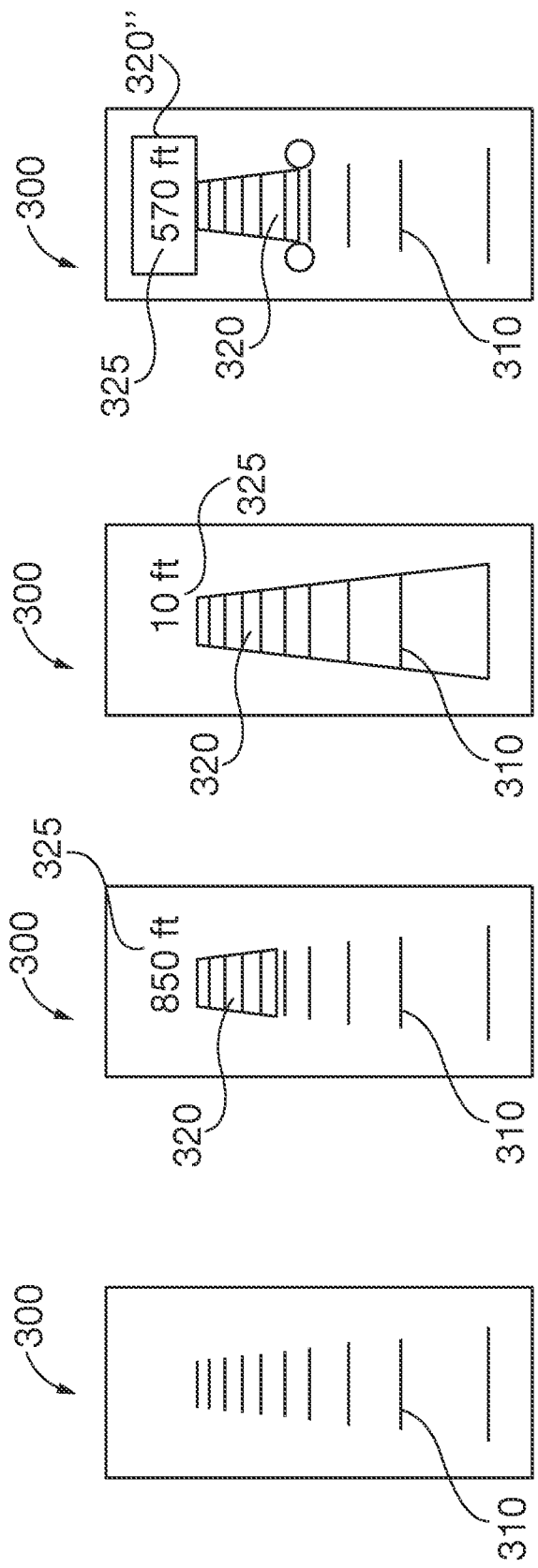

RAILWAY BRAKING AND THROTTLE GUIDANCE USER INTERFACE

BACKGROUND OF THE DISCLOSURE

1. Field of the Invention

The invention relates to controlling movement and speed of trains on railways, and more particularly to a user interface that assists train operators to optimize throttle and brake application of train speed controls. As used herein, the term "train" is a locomotive alone, one or more locomotives with cars, or an integrated locomotive/car vehicle, (e.g., light rail or subway).

2. Description of the Prior Art

Rail lines establish maximum local operating speeds along the track right of way, dictated among other things by track conditions, train line congestion and distances ahead of trains that are needed for braking and acceleration to different speeds. Railway operators also establish points of interest along the railway tracks that suggest minimal or optimal speeds for local track conditions, efficient energy usage and travel scheduling. Other or units exist along the railway tracks that mandate maximum speeds or need to stop completely. Points of interest, may be fixed and marked by trackside signals (e.g., visual signage, sensors, and/or wireless transmitters). Points of interest may also be varied depending upon operating conditions, and communicated to the train operators via reconfigurable electronic signage or wireless transmission.

Electronic onboard and/or remote oversight of train operation is becoming more prevalent in order to optimize system-wide operation based on changing conditions and reduce likelihood of human error caused incidents. So-called Positive Train Control (PTC) Systems provide for onboard and remote monitored automatic train operation supervision and control by an electronic Onboard Unit (OBU). The OBU is coupled to or incorporated within the locomotive train control system, sometimes referred to as the train management system (TMS). The TMS OBU automatically slows or stops a train that exceeds local speed restrictions or fails to obey a stop signal. The most aggressive OBU control operation is complete stopping of a train that exceeds maximum local speed limits or fails to stop at a designated stopping point. Energy and scheduling time are wasted when an OBU forces a train to come to a full stop from steady state operating conditions, ascertain the events causing the stop, and restart the train back up to operating speed.

Train operation is complex; among other reasons due to momentum force-induced response phase lags during acceleration and deceleration of a relatively heavy vehicle on a fixed, relatively narrow track path. Through operational experience accumulated over time, a train operator develops intuitive judgment when to apply train throttle and brake settings of the train speed controls to meet changing operating conditions and upcoming new speed restrictions. Human interface guidance tools have been developed to assist train operators in making decisions when and how to apply throttle and brake settings.

FIG. 1 shows one known train operator interface 20 that graphically gives the operator feedback about train track 21 relative position of a train 22 and a critical point 24 that may be a stop signal, track switch, change in local speed, etc. A train stopping distance bar 26 (often visually displayed as a vertical red colored bar) moves between the train 22 and the critical point 24 and signifies actual distance needed to bring the train to a different new lower speed or a full stop. A warning distance yellow vertical bar 28 also moves, and signifies a warning time interval ahead of the stopping distance bar 26. If the warning distance bar 28 reaches the critical point an audio and/or visual enunciation warning will be given to the train operator to take action to bring the train to the required operating state (e.g., stop or mandated lower maximum speed) before the OBU undertakes its own automatic action. In using the prior art interface 20 the operator's goal is to make sure that the warning distance bar 28 does not reach the critical point 24, so as to avoid both alarm enunciation and OBU automatic intervention. However, the interface 20 does not give the train operator feedback on train speed brake and/or throttle settings needed to conform the train the required operating conditions before the warning distance bar 28 reaches the critical point 24: in other words, when and how much to apply throttle or brake.

Another known type of train operator interface is a display screen configured in accordance with European Railway Agency (ERA) Standard ERA_ERMTS_015560, as shown in FIGS. 2-4. The display screen 30 includes a distance to critical point target guide portion 32, with an analog relative distance scale portion 34, a digital distance to target display 36, and an analog distance bar 38 that is proportionally sized to the distance scale 34. As was also a challenge when using the interface 20, the train operator does not perceive direct feedback from the target guide portion 32 when or how much brake or throttle to apply, nor their respective appropriate application timing.

In order to give the train operator guidance on permissible local train speed—but not how to actuate the throttle and brake controls to achieve a permissible speed—the ERA display screen 30 has a speedometer or "tacho" 40, with a circular analog speed calibration ring or scale 42, a moving color-changing analog pointer 44 and a digital speed readout 46 located in the pointer hub portion. A series of sequential color-coded arcuate speed status bands 50, 52, 54 are displayed on the periphery of the speed scale 42 and change in length to correspond to changes in local permissible speed conditions.

Normal status speed band 50 (color-coded gray) indicates the permissible localized speed range. Indicator status band 52 with maximum speed status limit line 53 (color-coded yellow in FIG. 2 along with the speedometer pointer 44) informs the train operator that the train is exceeding normal permissible speed, so that he or she can undertake steps to slow down the train. Overspeed/warning status band 54 (color-coded orange in FIG. 3 along with the speedometer pointer 44) warns the operator that the OBU will intervene in and override operator train speed control by applying train brakes unless the operator undertakes immediate steps to slow down the train. Should the train speed exceed the intervention speed the OBU will apply train brakes to bring the train to a complete stop, and will so indicate intervention mode with status band 56 (color-coded red along with the speedometer pointer 44).

While the ERA user display 30 speedometer 40 does apprise a train operator of permissible local speed ranges and the target guide portion 32 the distances to critical points, it does not give the train operator guidance on how to set the throttle and brake controls to reduce train speed. The train operator must make her or his determinations whether and how much to apply brake or throttle in order to operate the train within, speed limits indicated by the status bands 50, 52, 54 and 56.

Thus, there is a need for a train operator user interface that gives guidance to the operator when and how much to apply brakes and throttle to conform the train to local operating speed restrictions, so as to avoid automatic intervention by the OBU.

There is an additional need for a train operator user interface that helps the operator intuitively understand brake/throttle corrections needed to conform the train speed to local operating speed conditions and give visual feedback when the proper corrections have been made.

SUMMARY OF THE INVENTION

Accordingly, an object of the invention is to create a train operator user interface that gives guidance to the operator when and how much to apply brakes and throttle to conform the train to local operating speed restrictions, so as to avoid automatic intervention by the OBU.

An additional object of the invention is to create a train operator user interface that helps the operator intuitively understand brake/throttle corrections needed to conform the train speed to local operating speed conditions and give visual feedback when the proper corrections have been made.

These and other objects are achieved in accordance with the present invention by a railway braking guide user interface that includes a visual display with a suggested throttle and/or brake speed control actuator setting guide portion, a speedometer portion and an optional distance to target guide portion. The interface visual display gives intuitive feedback information helpful for train operator decisions on how an when to change train speed control throttle and brake settings. The distance to target guide portion includes an analog target display that grows in size as the train approaches a target point speed change or stop position. The speedometer includes an analog speed indicator needle moving relative to a speed scale and a suggested target speed indicator. The target speed indicator suggests a braking speed consistent with local operating conditions and anticipated future changes in speed conditions ahead. The train driver slows or speeds the train by application of brake, throttle or both, to move the speed indicator needle in alignment, with a suggested target speed indicator. One or more speed bands are associated with the target indicator. The speed bands are oriented outside the speed scale, and they change width and position based on train speed and distance to target.

The present invention features a railway train user interface apparatus for a train speed control actuator selected from the group consisting of brake actuator, throttle actuator or combination of both. The interface includes a visual display, including a suggested speed control actuator setting guide having an analog control actuator setting scale. The interface also includes an analog suggested control actuator setting indicator aligned with and in relative motion with the control actuator setting scale that indicates a suggested control actuator setting for conforming the train to anticipated up-track speed restrictions. The interface additionally includes an analog actual control actuator setting indicator aligned with and in relative motion with the control actuator setting scale, indicating an actual control actuator setting on the control actuator setting scale.

The present invention also features a railway train user interface apparatus, comprising a visual display including a speedometer. The speedometer has an analog speed scale; an analog speed pointer aligned, with and in relative motion with the speed scale, indicating actual train speed on the speed scale; and an analog target speed indicator aligned with and in relative motion with the speed scale, indicating a specific suggested target operating speed for conforming the train to anticipated up-track speed restrictions.

The present invention additionally features a railway train speed control system, comprising an onboard control unit for controlling a railway train drive control and brake control units and a human machine interface (HMI) coupled to the onboard control unit. The HMI has throttle and brake controls actuated by a human operator and a visual display. The visual display includes a speedometer display having an analog speed scale; an analog speed pointer aligned with and in relative motion with the speed scale, indicating actual train speed on the speed scale; and an analog target speed indicator aligned with and in relative motion with the speed scale, indicating a specific suggested target operating speed for conforming the train to anticipated up-track speed restrictions. The train operator actuates brake and throttle controls to align the analog speed pointer with the analog target speed indicator.

Additionally the present invention features a computer software storage medium apparatus, comprising non-transient software stored in a non-volatile storage medium for operating a railway train human machine interface (HMI) visual display that is controlled by a processor coupled to a memory device. The HMI capable of retrieving and storing a copy of the software from the storage medium and causing the processor to execute the software to control the visual display by generating a visual display of a train speed control actuator selected from the group consisting of brake actuator, throttle actuator or combination of both. The actuator visual display includes a suggested speed control actuator setting guide, having an analog control actuator setting scale. The visual display also includes an analog suggested control actuator setting indicator aligned with and in relative motion with the control actuator setting scale, indicating a suggested control actuator setting for conforming the train to anticipated up-track speed restrictions. The display additionally includes an analog actual control actuator setting indicator aligned with and in relative motion with the control actuator setting scale, indicating the actual control actuator setting on the control actuator setting scale.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which:

FIGS. 14-17 show the braking distance guidance portion of the railway guidance user interface of FIG. 7, as a train approaches an exemplary critical point of interest along a railway track, respectively from a distance too far away to be of significance, then respectively showing warning distances of 850 feet, 10 feet and finally showing warning distance to a full-stop braking point 570 feet ahead of the train;

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in railway train user interfaces that assist train, operators to by suggesting optimal or desirable speed control throttle and/or brake application settings and intuitive feedback whether the operator is successfully conforming actual speed control settings to the suggested settings. The interface of the present invention alerts and helps the train operator intuitively recognize train distance from critical points along the railway track. The interface of the present invention also alerts the train operator whether train speed conforms with local speed restrictions and offers intuitively recognizable guidance on how to alter train speed with sufficient reaction time to avoid excessively rapid braking or OBU intervention that otherwise wastes fuel and disrupts travel schedules. The speedometer display of the present invention displays an analog suggested target speed along a speedometer scale that will enable the operator to conform train operating speed to a new up track speed restriction. The operator changes brake and/or throttle settings to align the speedometer actual speed pointer with the target speed indicator. In some embodiments of the present invention the interface suggests brake and/or throttle settings for reducing train speed.

Train Control System General Description

Figure 5:
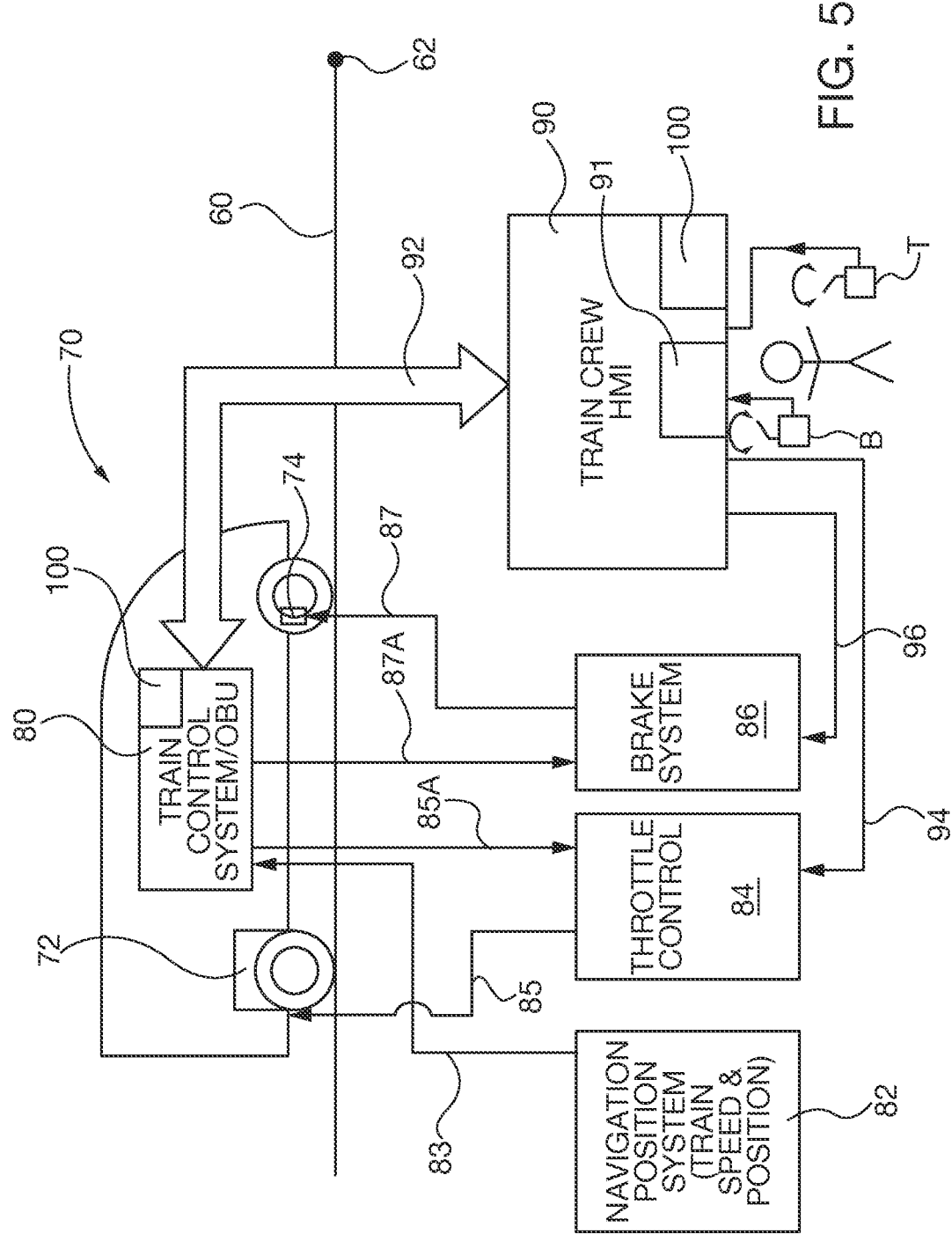
FIG. 5 is a train control system general schematic drawing showing interaction of train subsystems.
Figure 6:
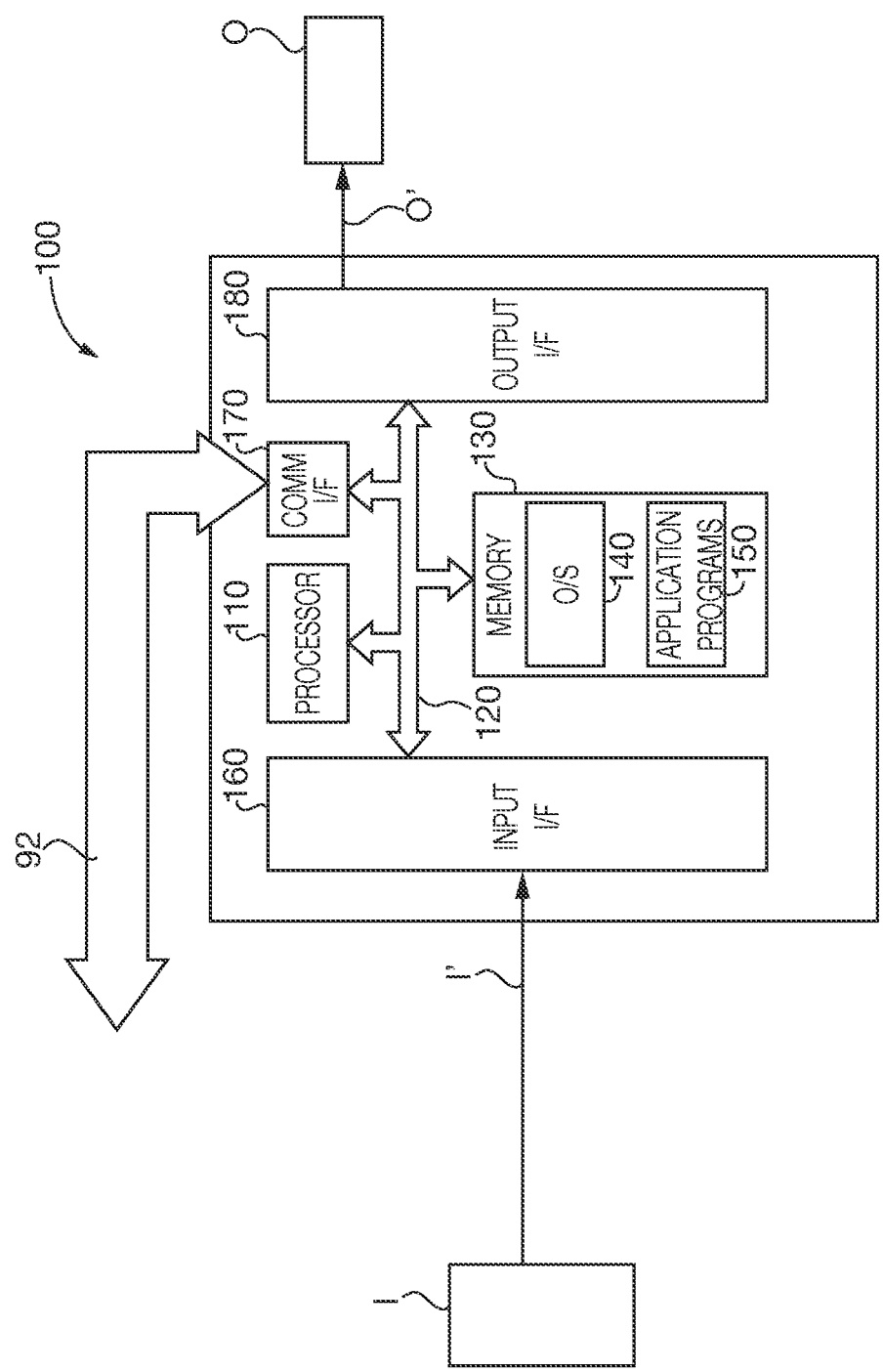
FIG. 6 is a schematic of a train control system computer or controller.

FIGS. 5 and 6 show generally a railway 60 with a critical point 62 for train control, such as a speed change restriction, track switch, stop signal, or the like. Train 70 generally has subsystems, including drive system 72 that provides driving force to one or more wheel carriages, and brakes 74 for altering train speed. The train control system, often referred to as the "train management system" (TMS) 80 is the central control system for the locomotive or for multiple slaved locomotives in a coupled set of railway locomotives and cars. The train control system 80 is the principal electronic control device for all other controlled train subsystems, including the onboard unit (OBU). The OBU is incorporated within the TMS 80 or is a separately coupled device that intervenes in train, speed control and braking in the event that the train operator fails to follow local track speed and stopping mandates. The train control system 80 also is coupled to the navigation position system (NPS) 82 that provides train position and speed information via communications pathway 83. Other subsystems coupled to the train control system 80 include throttle control 84 that causes the drive system 72 (e.g., more or less throttled speed) via communications pathway 85 and receives commands from the OBU 80 via communications pathway 85A. The brake system 86, via communication pathway 87, causes the brakes 74 to brake the train 70. The brake system 86 also receives commands from the OBU 80 via communications pathway 87A. The train 70 also has a train crew human-machine interface (HMI) 90 that has an electronic display screen 91 and operator actuated brake B and throttle T train speed control actuators, so that the train operator can drive the train. The HMI 90 communicates with the OFF 80 via communications data bus 92, though other known communications pathways can be substituted for the data bus when implementing other known control system architectures. The HMI 90 communicates train operator respective throttle T and brake B control commands to the respective throttle control 84 via communications pathway 94 and the brake system 86 via communications pathway 96.

Each of the OBU train control system 80 and the HMI 90 have internal computer/controller platforms 100 of known design that communicate with each other via data bus 92, however the number of computer controllers, their location and their distributed functions may be altered as a matter of design choice. In this exemplary embodiment, general control of train 70 subsystems is performed by OBU 80 and the controller platform 100 therein and the HMI functions are performed by HMI 90 and the controller platform 100 therein.

Referring to FIG. 6, controller platform 100 includes a processor 110 and a controller bus 120 in communication therewith. Processor 110 is coupled to one or more internal or external memory devices 130 that include therein operating system 140 and application program 150 software module instruction sets that are accessed and executed by the processor, and cause its respective control device (e.g., OBU 80 or HMI 90) to perform control operations over their respective associated subsystems.

While reference to an exemplary controller platform 100 architecture and implementation by software modules executed by the processor 110, it is also to be understood that the present invention may be implemented in various forms of hardware, software, firmware, special purpose processors, or a combination thereof. Preferably, aspects of the present invention are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform 100 also includes an operating system and microinstruction code. The various processes and functions described herein may be either part of the microinstruction, code or part of the program (or combination thereof) which is executed via the operating system. In addition, various other peripheral devices may be connected to the computer/controller platform 100.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computer platforms or devices may be interconnected using any existing or later-discovered networking technology and may also all be connected through a lager network system, such as a corporate network, metropolitan network or a global network, such as the Internet.

Computer/controller platform 100 receives input communications from one or more input devices I via respective communications pathways I' through input interface 160, that in turn can distribute the input information via the controller bus 120. The controller platform 100 also has a communications interface 170 for communication with other controllers on a shared external data bus, such as the data bus 92. Output interface 130 facilitates communication with one or more output devices O via associated communications pathways O'.

In the present invention the computer/controller platform 100 in train control system 80 is associated with input devices I/associated input, communications pathways I' that include the navigation position system (NPS) 82/83. Output devices O/associated output communications pathways O' that are associated with that computer/controller platform 100 include override communications to the throttle control 84/85A and brake system 86/87A.

Similarly in the present invention, the computer/controller platform 100 in 5141 system 90 is associated with input devices I/associated input communications pathways I' that include the human operated throttle T and brake B speed control actuators and any touch screen input, functions of display 91. Output devices O/associated output communications pathways O' that are associated with the HMI System 90 computer/controller platform 100 include the throttle control system 84/94 and the brake control system 86/96.

The OBU subsystem that is coupled to the train control system 80 monitors track position and speed of the train 70 to assure that the latter is operated within local permissible speed limits, including braking distances needed to stop the train ahead of critical stopping points, such as switches or track crossings. If the train operator does not operate the train 70 within permissible speeds the OBU intervenes once the train exceeds a local intervention speed limit. If the operator fails to stop the train 70 by a critical braking point, the OBU will also intervene to stop the train. Train operators seek to avoid OBU automatic intervention because it wastes fuel and causes the stopped train to deviate from its pre-arranged travel schedule. The brake and throttle user interface of the present invention helps train operators maintain designated travel speeds and adhere to stopping point commands, by suggesting target speeds associated with the speedometer speed scale that will enable the train to change speed in sufficient time and distance ahead of an upcoming new speed restriction. In this way OBU 80 automatic intervention is not required, because the train operator avoids exceeding the maximum permissible intervention speed.

Brake and Throttle User Interface

Figure 7:
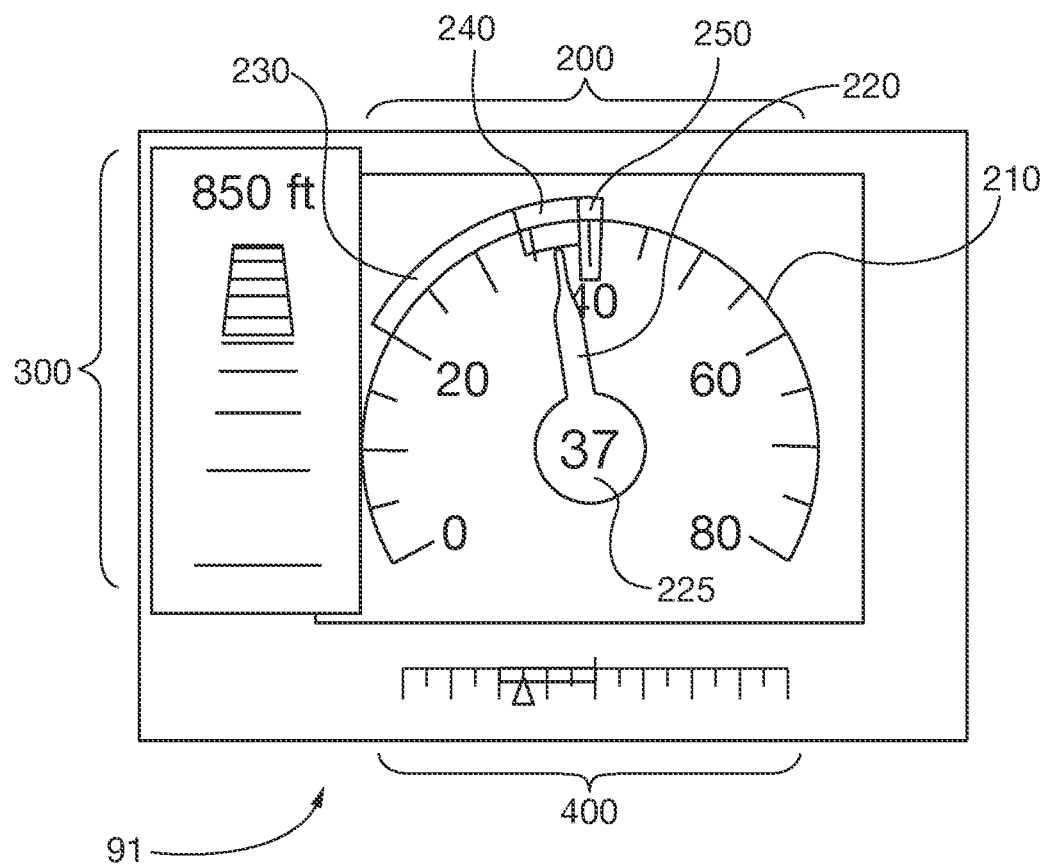
FIG. 7 is an elevational view of a railway braking guidance user interface of the present invention, including a speedometer portion, a braking distance guidance portion, and a recommended speed control actuator brake/throttle guidance portion.

User interface software application program modules 150 that are executed by the computer/controller platform 100 in the HMI System 90 cause the display 91 to create an operator-visible image as shown in FIG. 7. The visual display includes a speedometer ("tacho") portion 200, a braking distance to target point guide portion 300, and a suggested brake/throttle setting guide portion 400. Any sub-combination of any or all of the display portions may be used in a display at the discretion of the display system designer, taking into account any train construction and operation regulations in force within any legal jurisdiction where the train is being operated.

Speedometer display 200 includes a circular analog speed scale 210 (e.g., in kilometers or miles per hour) and pivoting pointer 220, the center hub of which is centered in the analog speed scale. The pointer 220 center hub also displays digital speed readout 225. The speedometer display 200 also includes sector-shaped speed range status indicator rings 230, 240, 250 that are oriented about the outer circumference of the speed scale 210. Displayed orientations, shapes and colors of any of the speed scale 210, pointer 220 and speed status indicator rings 230, 240, 250, including the pointer hub and location of the digital speed readout 225, may be modified from those shown herein. Alternatively, the pointer 220 may be stationary while the speed scale 210 moves, so long as there is relative movement between scale and pointer.

The speed status indicator rings include the following speed information:

Ring 230—permissible local speed range, or suggested speed range within the permissible range (gray, radially thin sector ring). The ring 230 sector arcuate width bounds upper end of the permissible speed range and the lower end a suggested train target speed indicator 235 that the driver should maintain in order to slow the train sufficiently to conform to the next anticipated speed change at a critical point ahead, preferably with minimal use of train brakes, in order to improve fuel consumption efficiency. As a train gets closer to a critical point with a lower speed restriction, the suggested lower end target speed limit of target speed indicator 235 will be reduced so that the train does not exceed the restricted speed (and cause OBU 80 brake intervention). The train operator goal is to keep the pointer 220 in alignment with the target speed indicator 235.

Ring 240—overspeed range warning that the train is exceeding local permissible speed and that the driver should undertake corrective action to lower the train speed, e.g., reduce throttle T setting and/or increase brake B setting (yellow, radially thicker sector ring). The ring 240 sector arcuate width bounds the upper end of the permissible speed range and the intervention speed;

Ring 250—braking intervention by the train control system OBU 80 to cause the brake system 86 to apply the brakes 74, to slow down the train to within permissible local speed limits and/or bring the train to a complete stop (red thickest sector ring or hash strip). The OBU 80 will intervene and apply brakes at the locally defined intervention speed.

The speed range status rings 230, 240, 250, speed scale 210 and pointer 220 all move relative to each other, as will be described in greater detail below, preferably with a static position speed scale and moving status rings/pointer. In the embodiment shown in FIGS. 8-10 the speed status range rings 230 (with target speed indictor 235), 240, 250 rotate circumferentially about the exterior periphery of the fixed speed scale 210 and the pointer 220 pivots within the interior circumference of the speed scale. The analog speed pointer 220 moves dynamically in real time against the speed scale 210, in conjunction with the digital speed indicator 225. In this way the train drive is always aware of the train's actual speed. Status rings 230 and 240 positions and arcuate speed range widths relative to the speed scale 210 vary in real time in conformity with local speed restrictions and closing distances to control points along the trackside. For example, while a train is relatively far away from the next critical point speed lowering such that there is a relatively large amount of time for the train to lower speed before reaching the critical point the permissible speed range ring 230 will display an upper level permissible speed for the present track section, with the lower end target speed indicator 235 suggested speed being lowered over time as the train gets closer to the critical point. As the train gets closer to the critical point the highest permissible speed will be lowered on the permissible speed range ring 230 and the warning speed range ring 240 will become wider. As the train travels closer to the critical point the train, has less time and space to perform braking operations necessary to conform to speed restriction at the critical point. As braking distances become more critical in less time, the permissible speed range ring 230 (including the target speed indictor 235), warning speed range ring 240 and the intervention speed ring 250 will all rotate to lower speeds on the speed scale 210. The driver perceives visual feedback from the display 91 speedometer 200 by color and width of the speed rings, and their relative positions against the analog pointer 220. The visual feedback cue for the train driver is to maintain the speedometer pointer 220 near the target speed indicator 235 on the lower end of the permissible speed ring 230's suggested speed. The analog pointer 220 may give the drive additional feedback cues by color change—for example white for "normal" permissible speed operation; yellow when the train is over permissible speed, with the yellow overspeed band 240 arcuate width giving the driver an additional visual cue as to the urgency of making the speed correction before risking OBU 80 braking intervention; and red indicating that speed intervention is occurring because the train is exceeding intervention speed.

Figure 8:
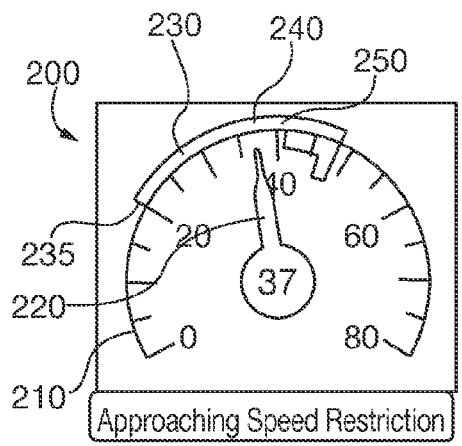
FIG. 8 shows the speedometer portion of the railway guidance user interface of FIG. 7, wherein the train is approaching a speed restriction.
Figure 9:
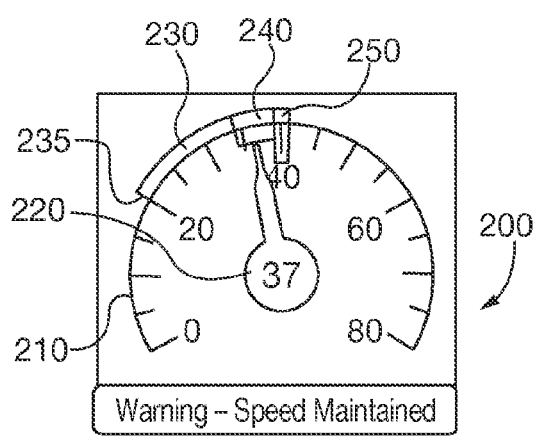
FIG. 9 shows the speedometer portion of the railway guidance user interface of FIG. 7, warning that the train is exceeding restricted speed.
Figure 10:
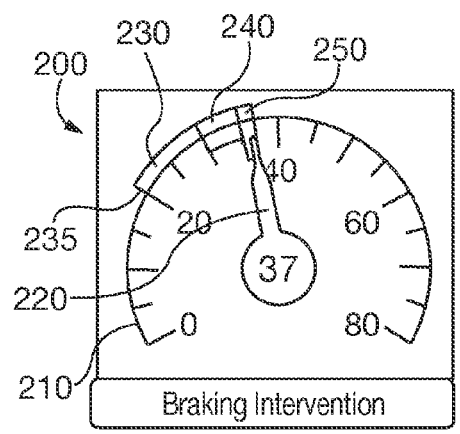
FIG. 10 shows the speedometer portion of the railway guidance user interface of FIG. 7, wherein the OBU has intervened and is braking the train.

FIGS. 8-10 are exemplary visual displays respectively: when the train is approaching a speed restriction control point, when the train is exceeding permissible speed, and when braking intervention is occurring. In FIG. 8, the target speed (20 mph) is indicated by the target speed indicator 235 at the lower limit of the gray permissible speed band 230. This is the speed to which the driver should be slowing. The warning speed band 240 and intervention speed band are also in gray, indicating respectively the warning speed and speed limit (intervention speed) relevant to the train's present position. The analog pointer 220 appears white, and along with the digital speed indicator 225 indicate that the train is traveling at 37 mph.

In FIG. 9, the train has maintained a constant speed (37 mph), but the warning speed indicated on the warning speed band 240 and the intervention speed limit band 250 have reduced as a result of approaching the "last chance braking curve" of distance needed to conform the train, to the speed at the next critical point. The actual speed is now in the warning zone, so the pointer needle 220 changes to yellow.

In FIG. 10, the train has incorrectly maintained, a constant speed of 37 mph, and the warning speed band 240 and speed limit intervention band 250 have reduced speeds on the speed scale 210 even further to where the intervention speed limit is below the actual speed. Once the intervention speed is exceeded the OBU 80 automatic PTC speed supervision intervenes to brake the train and overrides train operator control.

Figure 11:
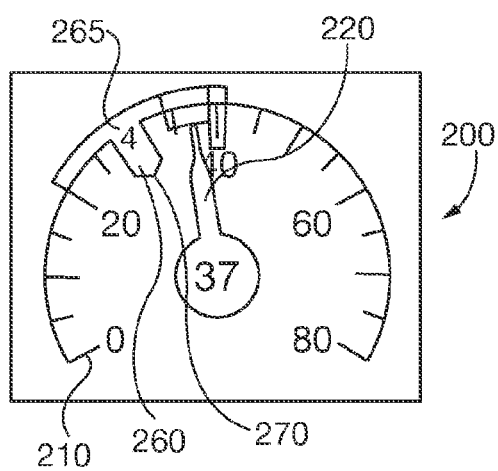
FIG. 11 shows the speedometer portion of the railway guidance user interface of FIG. 7, displaying a suggested brake setting for reducing train speed to within permissible limits.

FIG. 11 shows another feature of the present invention, wherein the visual display 91 speedometer portion 200 displays a suggested brake control setting band 260, that displays to the train operator a suggested brake control B setting in a digital readout 265 (here displayed as brake setting 4) as well as a suggested braking target speed indicator at the pointed tip portion 270. A train driver viewing the display intuitively grasps that he or she should set the brake control B to setting 4 (i.e., "how much" to brake) and views a suggested braking target speed indicator at the end of the blue suggested braking speed pointer 270. The driver intuitively understands to apply the brakes until the analog speed pointer 220 radially aligns with the blue braking target speed indicator pointer 270. A similar throttle control setting band (not shown) can be incorporated in the speedometer portion 200 of the display 91, with a functionally equivalent throttle control T setting in a digital readout similar to the braking setting digital readout 265, and a suggested throttle speed indicator similar to the suggested braking target speed indicator at the pointed tip portion 270.

Figure 12:
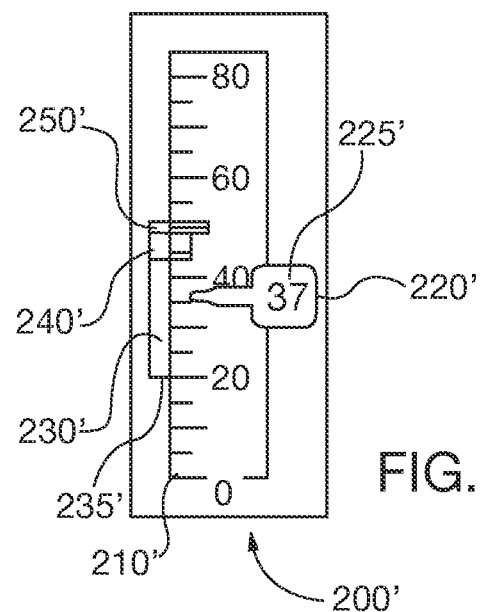
FIG. 12 shows an alternative embodiment of speedometer portion of the railway guidance user interface of FIG. 7.
Figure 13:
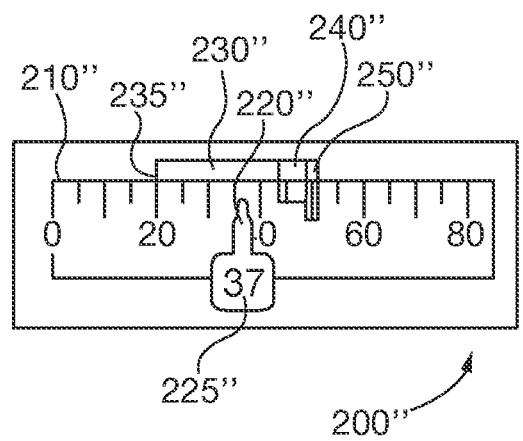
FIG. 13 shows another alternative embodiment of speedometer portion of the railway guidance user interface of FIG. 7.

As was previously indicated, the visual shapes, colors and relative orientation/configuration of the speedometer components can be altered from the embodiments shown in FIGS. 7-11. For example, in FIG. 12 the speedometer 200' has vertical relative linear motion between the speed scale 210', analog pointer 220', digital speed readout 225', target speed indicator 235, and the speed hands 230', 240' and 250'. In FIG. 12 the speedometer 200" has horizontal relative linear motion between the speed scale 210", analog pointer 220", digital speed readout 225", target speed indicator 235", and the speed bands 230", 240" and 250".

As was previously noted, the display 91 in FIG. 7 also has a distance to target braking guide 300 that intuitively informs the train driver graphically how quickly the train is approaching the target. Referring to FIGS. 14-17, the target braking guide 300 includes an analog distance scale 310 and a digital readout of distance to target 325. As shown in FIG. 14, when the train is relatively so far ahead of the next target that braking is not needed the scale 310 is clear and there is no digital readout of distance to target. In FIG. 15 the train is now approaching the target point and braking action is now more immediate. The distance to target display 300 shows the distance to target as 850 feet on the digital readout 325, and the analog target 320 appears as filling half the distance scale 310 bars. In FIG. 16 the train is only 10 feet ahead of the target point, as indicated on the digital readout 325 and the target shape 320 fills the entire distance scale 310. Conforming with real-life experience of the train operator, the closer the train approaches the actual target, the target image 320 grows in size. Target shape 320 may vary depending upon the type of critical target point to be encountered ahead on the rail tracks, e.g., speed restriction, full stop point, change in track operating condition due to weather or traffic volume, etc. In FIGS. 15 and 16, the target 320 signifies a speed restriction in the color yellow (thus intuitively compatible with the yellow analog speed pointer 220 and yellow warning speed band 340 of the speedometer readout 200). In FIG. 17, the critical target point is a full stopping point and the display analog target 320' is a horizontal red bar that surrounds the digital distance to target indicator 325. The red horizontal bar 320" is intuitively compatible with the braking intervention band 250 of the speedometer 200 display.

Figure 1:
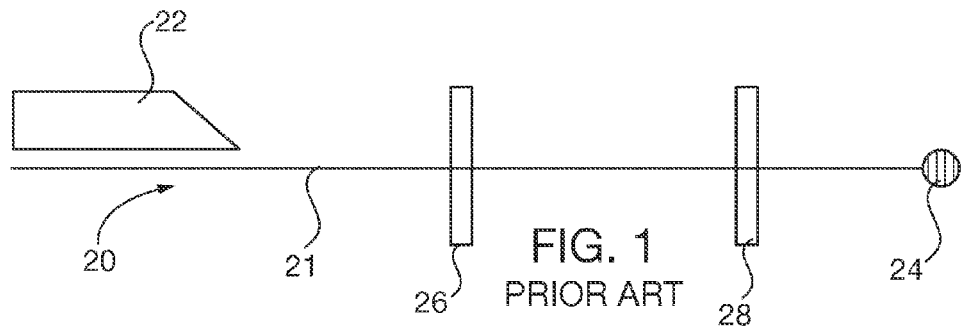
FIG. 1 shows a prior art train operator interface that displays train braking position relative to a braking warning position and a critical position.
Figure 2:
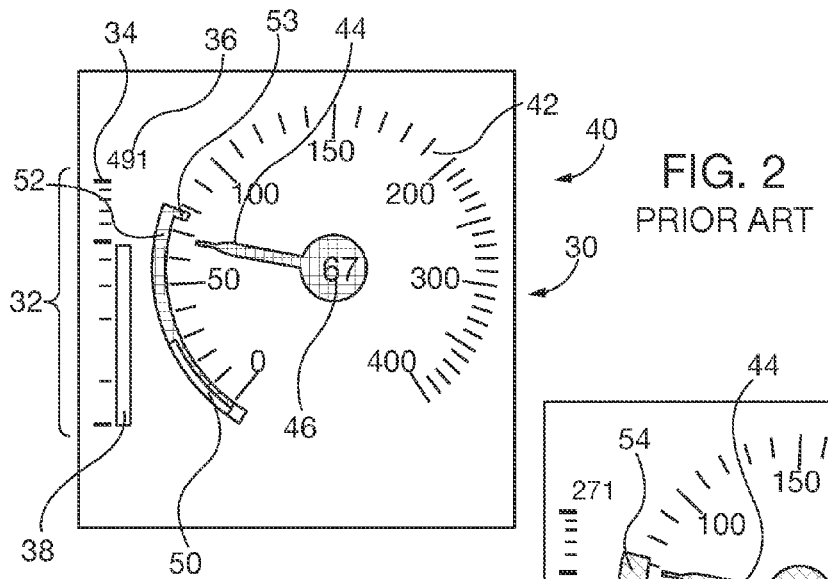
FIGS. 2-4 show a prior art European Railway Agency user display indicating respectively a train exceeding normal permissible speed, overspeed warning status and intervention status.
Figure 3:
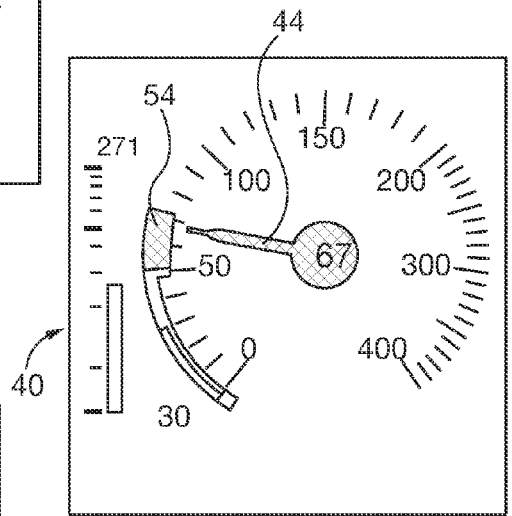
Figure 4:
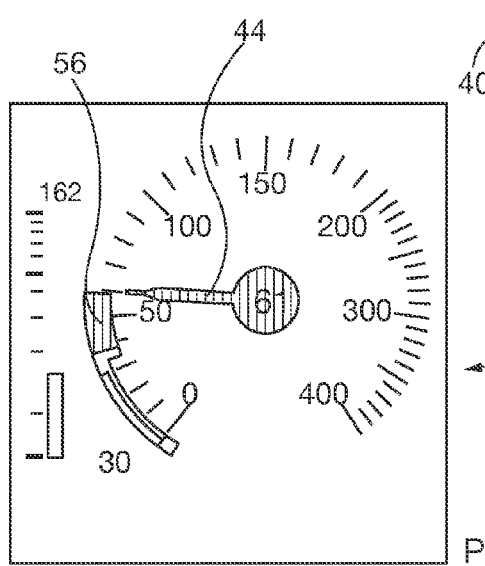
Figure 18:
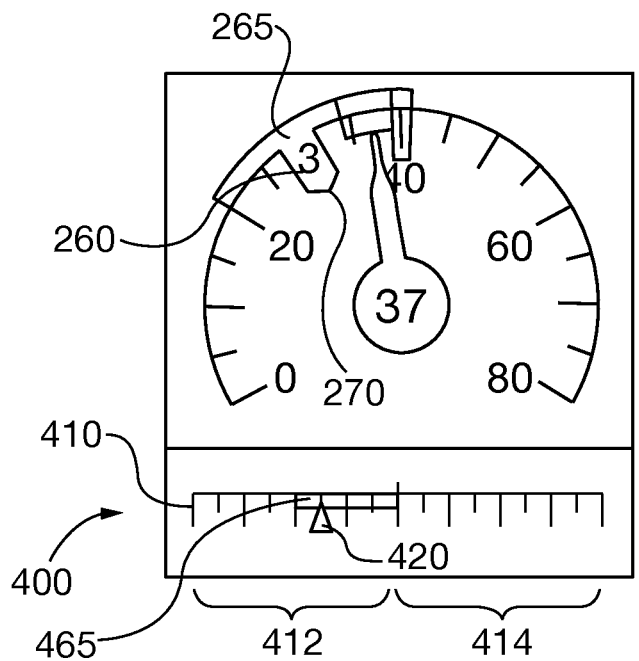
FIGS. 18 and 19 show the recommended speed control actuator brake/throttle guidance portion of FIG. 7, respectively with the train needing to decelerate (more brake application) and accelerate (more throttle application).
Figure 19:
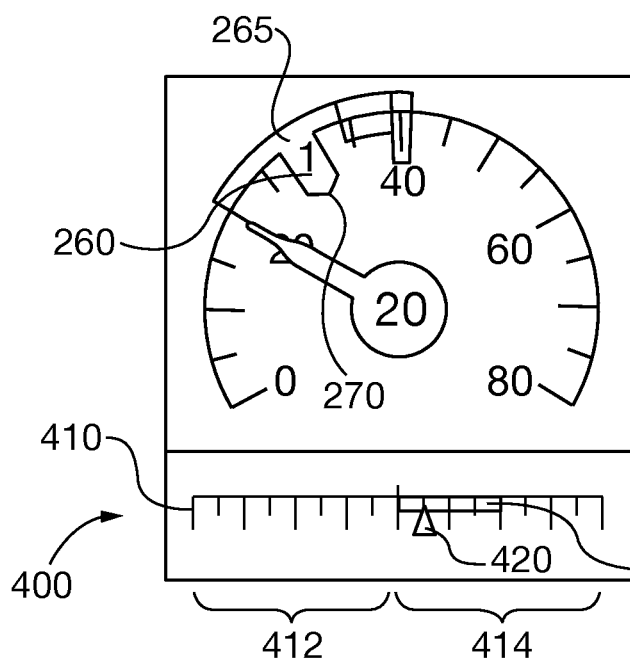

Also as previously noted the display 91 in FIG. 7 also has a suggested brake/throttle speed control actuators setting guide 400 that displays the actual brake or throttle setting and a suggested corresponded setting that will conform the train to a desired upcoming speed change (including up to a full stop). Referring to FIGS. 18 and 19, the brake/throttle setting guide 400 includes an analog setting scale 410, with brake settings 412 on the left side and throttle settings 414 on the right side. Orientation and relative arrangement of the scale 410 may be varied. Actual brake/throttle speed control actuator setting is shown by the triangular indicator 420, but other indicator shapes and colors may be utilized. Recommended throttle setting is shown by the band 465 with the outermost extreme edge of the band indicating an optimal recommended setting. Beneficially the display 91 may combine the suggested brake/throttle setting guide 400 with adjacent zero settings on each respective setting scale 410, 412, a suggested target speed indicator pointed tip portion 270 (and optionally a digital suggested setting 265 as was shown in FIG. 1).

In FIG. 18 the train needs to decelerate the target speed indicator 270 shows a lower suggested speed and the recommended braking setting indicator 465 is to the left of the actual brake setting indicator 420. The train operator is guided to increase the brake setting until the triangular actual brake setting indicator 420 aligns with the outermost left edge of the recommended setting indicator 465.

Conversely, in FIG. 19 the train needs to accelerate: the target speed indicator 270 shows a higher suggested speed and the recommended throttle setting indicator 465 is to the right of the actual brake setting indicator 420. The train operator is guided to increase the throttle setting until the triangular actual throttle setting indicator 420 aligns with the outermost right, edge of the recommended setting indicator 465.

The speedometer 200, distance to target 300 braking guidance and brake/throttle speed control actuator setting guidance 400 user interfaces of the HMI display 91 intuitively give the train operator feedback on when and how much to set manual throttle T and brake B speed control actuators in order to conform the train to required track speed conditions. With respect to the speedometer 200 the driver perceives color coded indicators of whether the train is being operated within permitted speed conditions (e.g., gray or white is "normal") and receives warnings when permitted speed is exceed as well as sense of urgency to react with throttle and/or brake controls (e.g., yellow speedometer pointer 220 and arcuate width of the warning speed band 240). The driver's intuitively simplest feedback mechanism is adjust throttle T and/or brake B controls to place the analog pointer needle 220 at the suggested target speed setting on the target speed indicator 235 that is placed at the lower end of the permissible speed band 230, or alternatively, the blue target speed indicator pointer 270 and avoid having the speedometer pointer needle 220 near the red speed limit intervention band 250. The throttle/brake speed control actuators setting guidance portion 400 aids the train operator to select a recommended brake or throttle setting, in order to minimize brake or throttle "overshoot".

Although various embodiments that incorporate the teachings of the present invention have been shown and described in detail herein, those skilled in the art can readily devise many other varied embodiments that still incorporate these teachings.

What is claimed is:

1. A railway train user interface apparatus for a train speed control actuator selected from the group consisting of brake actuator, throttle actuator or combination of both, comprising:
   a visual display, including a suggested speed control actuator setting guide having:
   an analog control actuator setting scale;
   an analog suggested control actuator setting indicator aligned with and in relative motion with the control actuator setting scale, indicating a suggested control actuator setting for conforming the train with anticipated
   an analog actual control actuator setting indicator aligned with and in relative motion with the control actuator setting scale, indicating an actual control actuator setting on the control actuator setting scale.

2. The apparatus of claim 1, wherein the visual display has both throttle and brake speed control actuator setting guides, each respectively having adjacent zero settings on their actuator setting scales; and a recommended control setting band on the analog control actuator setting scale and having an outermost extreme edge of the band indicating an optimal recommended control setting for the brake actuator, the throttle actuator or combination of both.

3. The apparatus of claim 1, further comprising:
   a human machine interface, coupled to the visual display, having a speed control actuator for actuation by a human operator;
   wherein actuation of the speed control actuator by the operator causes relative motion between the actual control actuator setting indicator and the control actuator setting scale.

4. The apparatus of claim 1 further comprising a railway train speed control system, having:
   an onboard control unit for controlling a railway train drive control and brake control units; and
   a human machine interface coupled to the onboard control unit, having throttle and brake speed control actuators actuated by a human operator;
   wherein a train operator actuates a speed control actuator to align the analog actual control actuator setting indicator with the analog suggested control actuator setting indicator.

5. A railway train user interface apparatus, comprising:
   a visual display including a speedometer display having:
   an analog speed scale;
   an analog speed pointer aligned with and in relative motion with the speed scale, indicating actual
   an analog target speed indicator aligned with and in relative motion with the speed scale, indicating a specific suggested target operating speed for conforming the train to anticipated up-track speed restrictions; and the speedometer display displays a suggested control setting band on the analog speed scale and which displays to the user a suggested control setting for brake control, throttle control or combination of both in a digital readout.

6. The apparatus of claim 5, further comprising at least one status indicator selected from the group consisting of:
   a permissible local speed range status indicator in alignment with the speed scale, having a lower end range corresponding with the target speed indicator and an upper end range corresponding with a maximum permissible local speed;
   an overspeed status indicator in alignment with the speed scale, having a lower end range abutting the permissible local speed status indicator upper end range and an upper end range abutting an intervention maximum speed; or
   an intervention speed status indicator in alignment with the speed scale, corresponding to the intervention maximum speed.

7. The apparatus of claim 5, further comprising a suggested speed setting band aligned with and in relative motion with the speed scale, the suggested speed setting band having an analog suggested target speed indicator indicating a specific suggested target operating speed for conforming the train with anticipated up-track speed restrictions, wherein the analog speed pointer aligns with the suggested target speed indicator as the train conforms with the suggested target operating speed.

8. The apparatus of claim 5, further comprising a suggested brake control setting guide, having:
   an analog brake setting scale;
   an analog suggested brake setting indicator indicating a suggested brake setting for conforming the train with the anticipated up-track speed restrictions; and an analog actual brake setting indicator aligned with and in relative motion with the brake setting scale, indicating actual brake setting on the brake setting scale.

9. The apparatus of claim 8, further comprising:
a human machine interface, coupled to the visual display, having a brake control actuated by a human operator;
wherein actuation of the brake control causes relative motion between the analog brake setting indicator and the brake setting scale.

10. The apparatus of claim 5, further comprising a suggested throttle control setting guide, having:
an analog throttle setting scale;
an analog suggested throttle setting indicator indicating a suggested throttle setting for conforming the train with the anticipated up-track speed restrictions; and an analog actual throttle setting indicator aligned with and in relative motion with the throttle setting scale, indicating actual throttle setting on the throttle setting scale.

11. The apparatus of claim 10, further comprising:
a human machine interface, coupled to the visual display, having a throttle control actuated by a human operator;
wherein actuation of the throttle control causes relative motion between the analog throttle setting indicator and the throttle setting scale.

12. The apparatus of claim 11, further comprising:
a brake control actuated by a human operator, coupled to the human machine interface; and
a suggested brake control setting guide, having:
an analog brake setting scale;
an analog suggested brake setting indicator indicating a suggested brake setting for conforming the train with the anticipated up-track speed restrictions; and
an analog actual brake setting indicator aligned with and in relative motion with the brake setting scale, indicating actual brake setting on the brake setting scale; wherein actuation of the brake control causes relative motion between the analog brake setting indicator and the brake setting scale.

13. The apparatus of claim 5, further comprising a distance to railway target braking guide display, having:
an analog distance scale, showing distance to a target point ahead of the train; and
an analog target superimposed on the analog distance scale that increases in display size as actual distance between the train and the target decreases.

14. A railway train speed control system, comprising:
an onboard control unit for controlling a railway train drive control and brake control units;
a human machine interface coupled to the onboard control unit, having:
throttle and brake controls actuated by a human operator; and
a visual display including a speedometer display having:
an analog speed scale;
an analog speed pointer aligned with and in relative motion with the speed scale, indicating actual train speed on the speed scale; and
an analog target speed indicator aligned with and in relative motion with the speed scale, indicating a specific suggested target operating speed for conforming the train to anticipated up-track speed restrictions;
wherein a train operator actuates brake and throttle controls to align the analog speed pointer with the analog target speed indicator; the speedometer display displays a suggested control setting band on the analog speed scale and which displays to the user a suggested control setting for brake control, throttle control or combination of both in a digital readout.

15. The system of claim 14, wherein the speedometer display further comprises a permissible local speed range status indicator in alignment with the speed scale and moving relative to the speed scale in coordination with the target speed indicator, having a lower end range corresponding with the target speed indicator and an upper end range corresponding with a maximum permissible local speed.

16. The system of claim 15, wherein the speedometer display further comprises:
an intervention speed status indicator in alignment with the speed scale, corresponding to an intervention maximum allowable train speed; and
an overspeed status indicator in alignment with the speed scale, having a lower end range abutting the permissible local speed status indicator upper end range and an upper end range abutting the intervention speed status indicator;
wherein the permissible local speed range and overspeed range status indicators move relative to the speed scale in coordination with the target speed indicator in response to the anticipated up-track speed restrictions.

17. The system of claim 14, wherein the visual display further comprises a throttle and brake controls suggested control setting guide, having:
an analog control setting scale;
an analog suggested control setting indicator indicating a suggested control, setting for conforming the train with the anticipated up-track speed restrictions; and
an analog actual control setting indicator aligned with and in relative motion with the control setting scale, indicating actual control setting on the control setting scale.

18. The system of claim 14, wherein the visual display further comprises a distance to railway target braking guide display, having:
an analog distance scale, showing distance to a target point ahead of the train; and
an analog target superimposed on the analog distance scale that increases in display size as actual distance between the train and the target decreases.

19. A computer software storage medium apparatus, comprising:
non-transient software stored in a non-volatile storage medium for operating a railway train human machine interface (HMI) visual display that is controlled by a processor coupled to a memory device, the HMI capable of retrieving and storing a copy of said software from said medium and causing said processor to execute said software to control the visual display by generating a visual display of a train speed control actuator selected from the group consisting of brake actuator, throttle actuator or combination of both, comprising:
a visual display including a suggested speed control actuator setting guide, having:
an analog control actuator setting scale;
an analog suggested control actuator setting indicator aligned with and in relative motion with the control actuator setting scale, indicating a suggested control actuator setting for conforming the train with anticipated
an analog actual control actuator setting indicator aligned with and in relative motion with the control actuator setting scale, indicating the actual control actuator setting on the control actuator setting scale; and a recommended control setting band on the analog control actuator setting scale and having an outermost extreme edge of the band indicating an optimal recommended control setting for the brake actuator, the throttle actuator or combination of both.

20. The apparatus of claim 19, wherein the generated display further comprises a visual display of a speedometer display having:
 an analog speed scale;
 an analog speed pointer aligned with and in relative motion with the speed scale, indicating actual train speed on the speed scale; and
 an analog target speed indicator aligned with and in relative motion with the speed scale, indicating a specific suggested target operating speed for conforming the train to the anticipated up-track speed restrictions.

21. The apparatus of claim 20, wherein the generated speedometer display further comprises:
 a permissible local speed range status indicator in alignment with the speed scale and moving relative to the speed scale in coordination with the target speed indicator, having a lower end range corresponding with the target speed indicator and an upper end range corresponding with a maximum permissible local speed;
 an intervention speed status indicator in alignment with the speed scale, corresponding to an intervention maximum allowable train speed; and
 an overspeed status indicator in alignment with the speed scale, having a lower end range abutting the permissible local speed status indicator upper end range and an upper end range abutting the intervention speed status indicator;
wherein the permissible local speed range and overspeed range status indicators move relative to the speed scale in coordination with the target speed indicator in response to the anticipated up-track speed restrictions.

22. The apparatus of claim 21, wherein the visual display further comprises a throttle and brake controls suggested control setting guide, having:
 an analog control setting scale;
 an analog suggested control setting indicator indicating a suggested control setting for conforming the train with anticipated up-track speed restrictions; and
 an analog actual control setting indicator aligned with and in relative motion with the control setting scale, indicating actual control setting on the control setting scale.

* * * * *